US006431217B2

(12) United States Patent
Robinson

(10) Patent No.: US 6,431,217 B2
(45) Date of Patent: Aug. 13, 2002

(54) LIQUID TRANSPORT DEVICE

(76) Inventor: Robert S. Robinson, 6337 Morris Rd., Hamilton, OH (US) 45011

(*) Notice: Subject to any disclaimer, the term of this patent is extended or adjusted under 35 U.S.C. 154(b) by 7 days.

(21) Appl. No.: 09/742,511

(22) Filed: Dec. 20, 2000

Related U.S. Application Data

(62) Division of application No. 09/108,411, filed on Jul. 1, 1998, now Pat. No. 6,206,980.

(60) Provisional application No. 60/065,225, filed on Nov. 13, 1997.

(51) Int. Cl.[7] ..................... F16L 57/00

(52) U.S. Cl. ..................... 138/110; 138/134; 138/153; 138/109

(58) Field of Search ..................... 138/109, 110, 138/131, 134, 153, DIG. 8; 239/25

(56) References Cited

U.S. PATENT DOCUMENTS

| | | | | | |
|---|---|---|---|---|---|
| 790,971 | A | | 5/1905 | Nicholls | |
| 858,575 | A | * | 7/1907 | Claflin | |
| 1,731,322 | A | * | 10/1929 | Riddle | 138/131 |
| 1,762,390 | A | | 6/1930 | Gavaza | |
| 1,794,581 | A | | 3/1931 | Burdick | |
| 1,891,639 | A | | 12/1932 | Gavaza | |
| 1,981,777 | A | | 11/1934 | Brinkman | |
| 2,185,741 | A | | 1/1940 | Sorg et al. | |
| 2,525,419 | A | | 10/1950 | Mellinger et al. | |
| 2,885,713 | A | | 5/1959 | Morrill | |
| 3,299,908 | A | | 1/1967 | Petzetakis | |
| 3,610,289 | A | * | 10/1971 | Moss et al. | 138/110 |
| 3,638,968 | A | * | 2/1972 | Barks | 285/8 |
| 3,889,717 | A | * | 6/1975 | Obadal et al. | 138/110 |
| 4,413,362 | A | * | 11/1983 | Chianco et al. | 4/567 |
| 4,431,031 | A | | 2/1984 | Ettlinger | |
| 4,456,034 | A | * | 6/1984 | Bixby | 138/122 |
| 4,458,377 | A | * | 7/1984 | Frohbieter | 15/320 |
| 4,703,785 | A | * | 11/1987 | Antos et al. | 138/109 |
| 4,784,184 | A | | 11/1988 | Gates | |
| 5,028,077 | A | * | 7/1991 | Hurst | 285/8 |
| 5,036,890 | A | * | 8/1991 | Whaley | 138/103 |
| 5,140,714 | A | * | 8/1992 | Horenstein et al. | 4/597 |
| D356,858 | S | | 3/1995 | Folkman | |
| 6,193,282 | B1 | * | 2/2001 | Assenheimer | 285/115 |
| 6,206,980 | B1 | * | 3/2001 | Robinson | 134/21 |
| 6,206,983 | B1 | * | 3/2001 | Robinson | 134/21 |

* cited by examiner

*Primary Examiner*—James Hook
(74) *Attorney, Agent, or Firm*—Wood, Herron & Evans, L.L.P.

(57) ABSTRACT

One version of the liquid transport device includes: a liquid conduit having a first end with a liquid-receiving opening, a second end with a liquid-dispensing opening, and a conduit-reinforcing member, the conduit-reinforcing member having a length of corrugated flexible tubing; and a faucet fastener connected to the liquid conduit.

8 Claims, 9 Drawing Sheets

LIQUID TRANSPORT DEVICE

CROSS-REFERENCE TO RELATED APPLICATIONS

This application is a divisional application of U.S. Pat. No. 6,206,980 with U.S. Ser. No. 09/108,411 filed Jul. 1, 1998 entitled "Multi-Functional Cleaning Machine" and issued on Mar. 27, 2001, which claims the benefit of the filing date of Provisional U.S. Patent Application No. 60/065,225 entitled "Multi-Functional Cleaning Cart" and filed on Nov. 13, 1997. The entire disclosure of Provisional U.S. Patent Application No. 60/065,225 and U.S. Pat. No. 6,206,980 is incorporated into this divisional application by reference.

BACKGROUND OF THE INVENTION

I. Field of the Invention

This invention is directed to a liquid transport device.

II. Description of Prior Art

Maintaining the cleanliness of commercial, industrial, institutional, and public buildings is an ongoing effort, and at times, an effort which seems more like a losing battle. This is particularly true for areas such as restrooms, locker rooms, cafeterias, and food service kitchens, where the volume of traffic in the particular area may make it difficult to maintain the cleanliness of the facility.

Building maintenance staff typically clean such areas on a routine basis using traditional mop-and-bucket assemblies, in which the bucket includes a detachable mop wringer, and is positioned on caster wheels, thereby enabling a building maintenance person to move the mop bucket from place to place, typically by pushing on the mop handle. Depending on the cleanliness of the mop, a worker may be able to make a good start in cleaning a floor using the mop bucket system. However, as soon as the worker makes a first pass and wrings the mop out, the entire mop bucket system is contaminated. From that point on, each time the worker plunges the mop into the bucket and rings the mop out, both the mop and "cleaning water" become more and more dirty.

One way to attempt to solve this problem is to make frequent water and mop changes. However, this adds time to an already laborious process, and therefore, there is little worker incentive to make frequent water and mop changes. Moreover, because a slop sink, source of clean water, or custodial supply room may be far away, a worker is even less inclined to make water and mop changes.

The end result is that a dirty floor gets cleaned by pushing dirty water around with a dirty mop. At best, the surface may have the appearance of being cleaned if concentrated spots of highly visible soil have been removed or spread around. In reality, however, given the limitations of these tools, the worker still is simply pushing dirt around the floor, as evidenced by the "five-o'clock shadow" of dirt seen frequently along the surface of walls adjacent the floor, as well as the "finger painting-like streaks" left by the mop when the water on the floor dries.

The cleanliness problem may be especially severe in the restrooms of these various buildings, and in fact, the number-one building maintenance complaint is dirty restrooms. Given the frequency with which these facilities are used, as well as the tools available for cleaning restrooms, the dirty restroom complaint is not particularly surprising. Building maintenance workers typically use the mop-and-bucket system described above to clean restroom floors. And, as noted above, while this system may pick up some dirt, it tends more typically to spread dirty water around on the floor. In addition, restrooms have many surfaces, such as urinals, toilets, dividers, walls, mirrors, sinks, and countertops, which simply cannot be cleaned using the mop-and-bucket approach. The tools for cleaning these surfaces, such as brushes, sponges, spray-bottle chemical disinfectants, cloth wipes, and the like, are extremely hands-on, and therefore, are less desirable to use. And, when chemical disinfectants solutions are used, generally a worker will spray the solution onto a surface, and wipe the solution off, either right away or within a few minutes. However, a chemical disinfectant typically must remain in contact with a surface for about ten minutes in order to kill bacteria. Accordingly, little, if any, chemical disinfecting actually is being done. Because these cleaning tools and methods are relatively unpalatable, building maintenance workers tend to clean these kinds of surfaces less frequently, and when they are cleaned, they are not cleaned thoroughly. The sanitation maintenance industry offers other pieces of cleaning equipment, such as pressure washers, wet vacs, pump-up sprayers, and janitor's carts. However, because of the limitations of several of these tools, as well as their single-task focus, sanitary maintenance professionals tend to use them in actual cleaning either infrequently, or not at all.

Most pressure washers operate at a pressure of 1000 PSI and above, a pressure which is far too high for many cleaning applications. For example, if such a pressure washer were use to mechanically clean a painted wall, it would blast the paint off of the wall surface. On the other end of the pressure spectrum are pressure washers having a pressure of about 100 PSI or less. And because of the type of pump used in these low pressure sprayers, the liquid exiting the sprayer actually has a far, far lower pressure, for example, about 40 PSI. Although such a low-pressure washer may be beneficial in applying a cleaning solution, it lacks the mechanical power required to actually clean a particular surface once the solution has been applied. Because pressure washers generally include a single clean-liquid water tank or container, both cleaning chemicals and water are loaded into this same container, which may be damaging to the device, particularly if a harsh cleaning chemical passes through a mechanical component, such as a pump. Because most pressure washers do not have there own water source, an operator must use a garden-type hose, and must have ongoing access to a corresponding faucet throughout the pressure washing process. Moreover, these pressure washers generally lack a convenient on-board storage system for storing the garden hose and power cord during transport.

Conventional wet-vacs provide a user with the ability to vacuum soiled cleaning solution from a floor. However, movement of these devices from place to place can be difficult because the vac hose, wand, and various tools typically must be carried independently of the wet-vac device. Furthermore, the drain outlet on such devices is designed for draining into a custodial slop sink, thereby requiring the user to take the wet-vac to a particular location in order to drain the device.

Pump-up sprayers also are available, which-enable a sanitation maintenance worker to sprinkle a cleaning solution under low-pressure onto a particular surface. In addition, the Industry provides various mobile janitorial carts, which may include storage shelves for various supplies, as well as a frame for a trash bag.

As is apparent from the discussion of the various cleaning tools presented above, sanitary maintenance professionals have a variety of tools from which to choose. However, these tools are either inadequate to do a proper cleaning job, or are so task-specific that they become user-unfriendly, given the many aspects involved in proper sanitation maintenance. Accordingly, given the relative ineffectiveness and/or inefficiency of the various tools available, particular facilities are not cleaned as well or as frequently as they should be, and morale and job satisfaction among many building maintenance professionals are relatively low.

SUMMARY OF THE INVENTION

The present invention provides an integrated, multi-functional, cleaning center, suitable for use in any of a number of different applications in the field of sanitary maintenance. To this end, and in accordance with the principles of the invention, one aspect of the invention is a multi-functional cleaning machine. The multi-functional cleaning machine includes a water tank, a liquid delivery line flowing from the water tank and capable of delivering liquid to a surface to be cleaned, and a cleaning-liquid draw line flowing into the liquid delivery line and capable of delivering a cleaning liquid from an independent source into the draw line. The cleaning machine further includes a vac tank capable of receiving dirty cleaning solution, and a vacuum connected to the vac tank.

The cleaning-liquid draw line enables a user to tailor the cleaning machine to a specific application within seconds. In particular, the user may select a first cleaning liquid to be used in cleaning a surface by connecting the draw line to that liquid. If a second (or third, or fourth, etc.) cleaning liquid is desired, the user simply disconnects the draw line and re-connects it to the second, or subsequent, cleaning liquid.

A particular version of the multi-functional cleaning machine further includes a spray gun connected to the liquid delivery line. In one form, the spray gun has a low-pressure setting and a high-pressure setting. When a user operates the gun in the low-pressure setting, cleaning liquid is drawn into the delivery line, where it combines with water from the water tank to form a cleaning solution. This cleaning solution then exits the spray gun under a relatively low pressure which does not aerosolize the cleaning solution. And because the solution does not get aerosolized, the risk of a worker breathing cleaning solution is dramatically lowered. When the user operates the gun in the high-pressure setting, cleaning liquid is no longer drawn into the delivery line, and water exits the spray gun at a relatively high pressure. The power of this more-pressurized water is particularly beneficial in mechanically cleaning a surface, and in rinsing loosened dirt and cleaning solution from a surface, thereby enabling a user to clean a surface thoroughly and prevent surface-buildup of cleaning liquid.

The invention also includes a method of cleaning, using the multi-functional cleaning machine. In contrast to traditional cleaning methods, the method of the invention allows disinfecting solutions to remain on soiled surfaces long enough for thorough disinfecting actually to occur.

Another aspect of the invention is a grout cleaning tool for use with a high-pressure liquid supply and a vacuum supply, for example, the liquid delivery line and vacuum of the multi-functional cleaning machine. The grout cleaning tool is particularly useful for cleaning floors which include grout lines, such as quarry tile and ceramic tile floors typically found in commercial kitchens and restrooms. The tool includes a housing having a front, a back, a top surface, a left side, and a right side, with the top surface including a liquid delivery opening and a soil uptake opening. In addition, the tool has a flexible wall with a front portion depending from the housing front and a back portion depending from the housing back, thereby forming a blast chamber between the front and back portions. This design enables a highly pressurized liquid to be delivered directly to a grout line, thereby removing soil, such as caked-on dirt and grease, and providing a cleaner and safer environment.

Yet another aspect of the invention is directed to a plunger gun for use with a high-pressure liquid supply, for example, the liquid delivery line of the multi-functional cleaning machine. The plunger gun includes a high-pressure spray gun having an elongated barrel, and a plunger bulb connected to the barrel. The plunger bulb may be releasably sealed about a conduit opening, for example, the opening of a toilet bowl or a drain pipe, thereby enabling a liquid under high-pressure to be controllably delivered into the conduit. While the plunger gun has many uses, it is particularly beneficial for unstopping passageways, such as clogged toilets and drains.

Another aspect of the invention is a liquid transport device. The liquid transport device may be used in any of a number of different sanitary maintenance situations, and is particularly useful in transporting any type of liquid from a faucet or spigot to another container. The device, itself, includes a liquid conduit having a first end with a liquid-receiving opening, and a second end with a liquid-dispensing opening, with the liquid conduit further including a conduit-reinforcing member. The transport device also has a faucet fastener connected to the liquid conduit. The liquid transport device is especially beneficial in filling the water tank of the multi-functional cleaning machine, in that it enables a user to fill the water tank from any conventional faucet without having to move the multi-functional cleaning machine to a special janitorial closet or other specific location.

The various aspects of the invention discussed briefly above combine to provide an effective and efficient cleaning tool, useful in cleaning numerous areas in and around commercial, industrial, institutional, and public buildings. Moreover, because the various aspects of the invention allow a sanitation maintenance worker to clean a particular room or facility more effectively, and to do so without having to touch soiled surfaces directly with the hands, the invention actually provides an incentive for these workers to do a thorough cleaning job, and may even assist in boosting worker morale. These and other benefits and advantages of the invention will be made apparent from the accompanying drawings and description of the drawings.

BRIEF DESCRIPTION OF THE DRAWINGS

The accompanying drawings, which are incorporated in, and constitute a part of, this specification, illustrate embodiments of the invention, and, together with the general description of the invention given above and the detailed description of the drawings given below, serve to explain the principles of the invention.

DETAILED DESCRIPTION OF THE DRAWINGS

Figure 1:
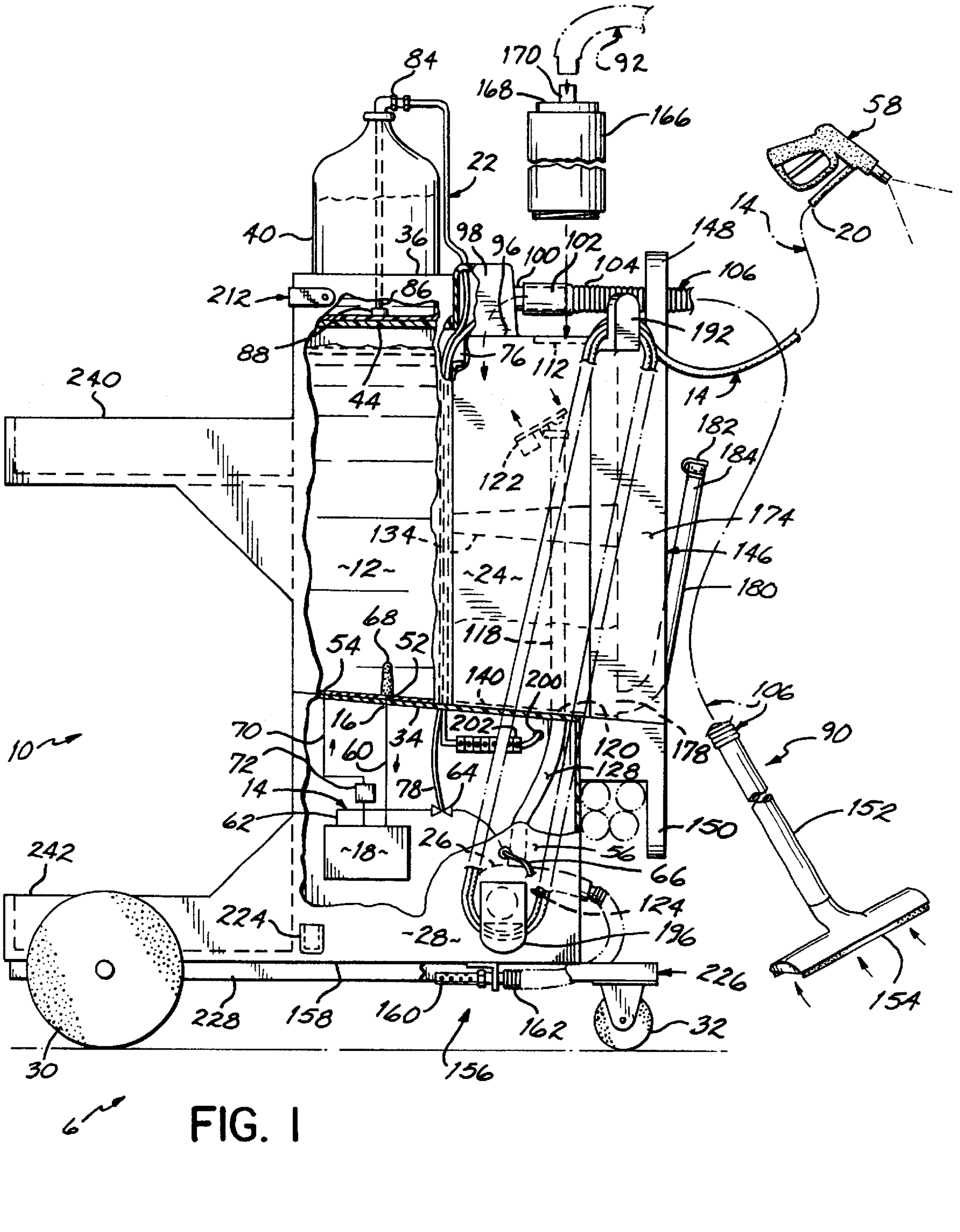
FIG. 1 is a partially-broken-away side view of one version of the multi-functional cleaning machine according to the principles of the invention.
Figure 2:
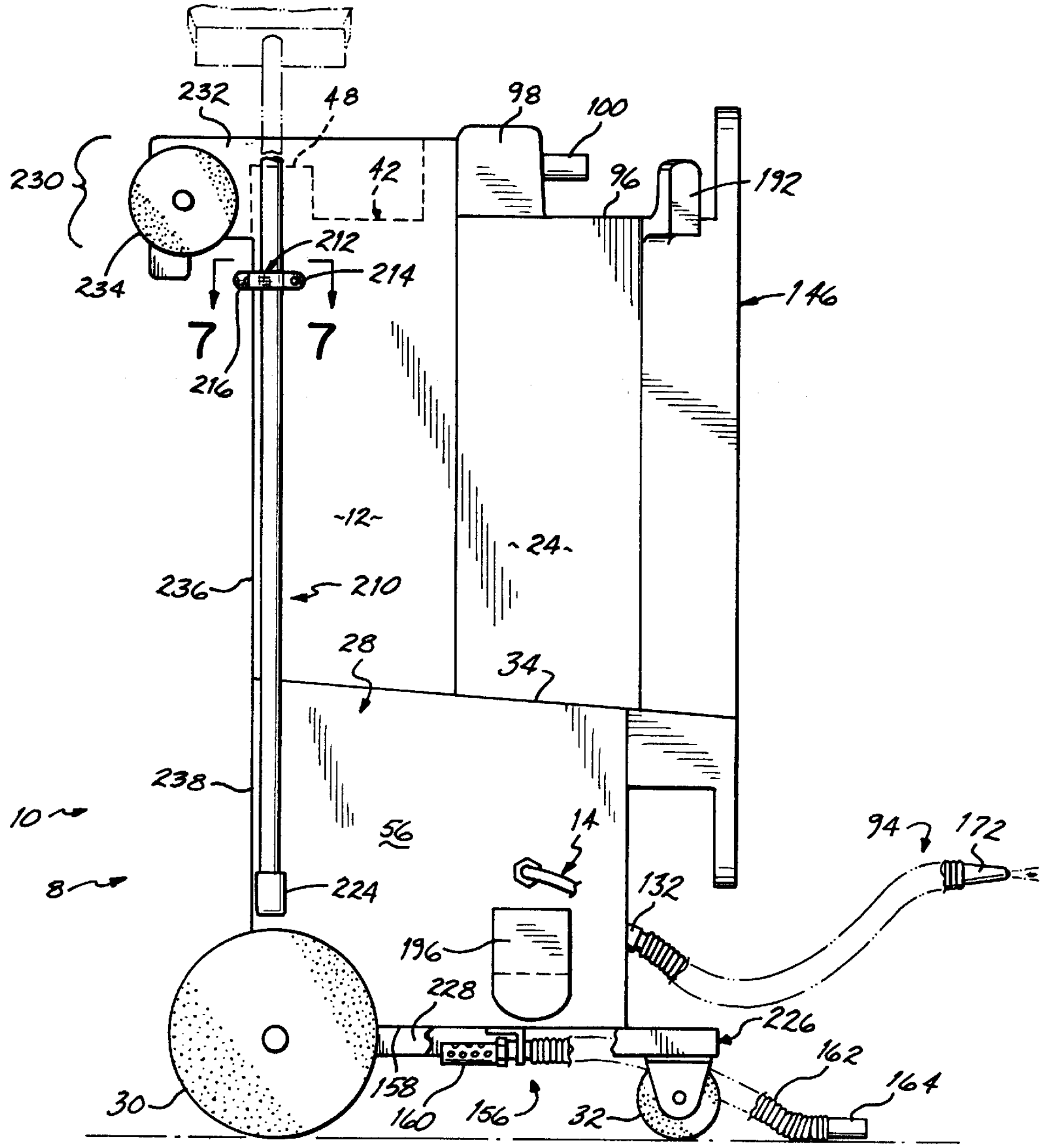
FIG. 2 is a partially-broken-away side view of another version of the multi-functional cleaning machine in accordance with the principles of the invention.

With reference to FIG. 1, one version 6 of the multi-functional cleaning machine 10 (Machine), in accordance with the principles of the invention, includes: a water tank 12; a liquid delivery line 14 having an inner end 16, a pump 18, and an outer end 20, the inner end being connected to the water tank; a cleaning-liquid draw line 22 connected to the liquid delivery line; a vac tank 24; and a vacuum 26 connected to the vac tank. With reference to FIG. 2, another version 8 of the Machine 10 includes these same components.

As is evident from the particular machines 6, 8 shown in FIGS. 1 and 2, the multi-functional cleaning machine truly is a mobile, cleaning center. In further detail, and as best shown in FIGS. 1–4, the Machine includes a base unit 28 which houses several of the Machine components, and which supports various tank assemblies. The base unit further includes two large wheels 30 and two caster wheels 32, thereby enabling a single person to move the Machine from one location to another with ease. The top wall 34 of the base unit serves as a platform for the water tank and the vac tank, both of which are securely fastened to the base unit. These three structural components combine to provide a framework for the various cleaning systems and features of the multi-functional cleaning machine. For instance, they serve as the frame-work for a pressure washing system and a vacuum recovery system.

Figure 4:
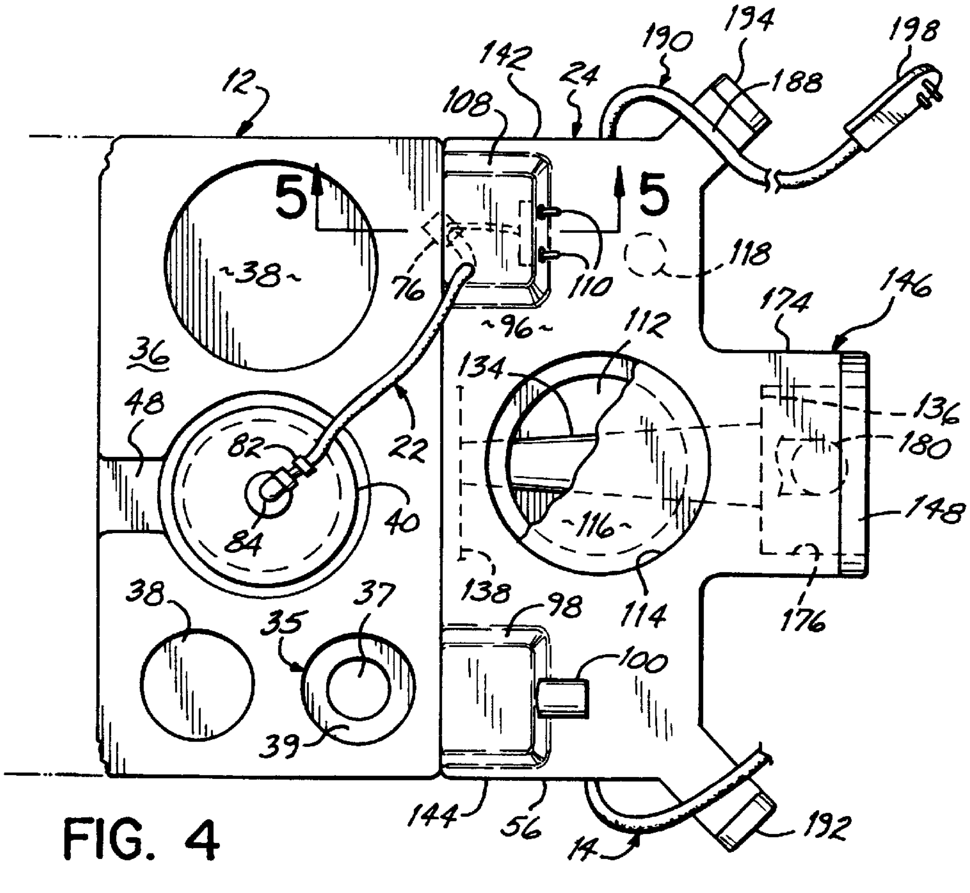
FIG. 4 is a partial top view of the multi-functional cleaning machines shown in FIGS. 1 and 2.

In the pressure washing system, and with reference to FIGS. 1 and 4, the top wall 36 of the water tank includes several recessed wells 38, which may be used to receive and releasably hold various cleaning items. Most advantageously, the wells are used to hold spray bottles, jugs, or other containers 40 of various cleaning liquids. The front right well 35 includes a round opening in its base, and serves as a fill port 37 for filling the water tank with clean water. This front right well also includes a peripheral flange 39 along the base for supporting a container, such as a spray bottle or the like. The central well 42 also includes a round opening in its base, and serves as an additional access port 44. This access port includes a peripheral flange 46 along the base for supporting a container, for example, a gallon jug. As shown in FIGS. 2 and 4, the top wall further includes a spillway 48 extending from the access port to the back of the water tank. The spillway serves to direct water toward the back 50 of the Machine, in the event that an operator accidentally overfills the water tank. With respect to the recessed wells in the top wall of the water tank, it should be understood that these wells may be made in any of a number of different sizes and positioned in any of a number of different alignments. For example, if desired, the top wall of the water tank may be molded such that the recessed wells have a shape or shapes which correspond with the proprietary shape or shapes of a particular cleaning liquid company's containers. Although any suitably sized water tank may be used, a water tank having a capacity of about 20 gallons has been found to be particularly beneficial.

Figure 3:
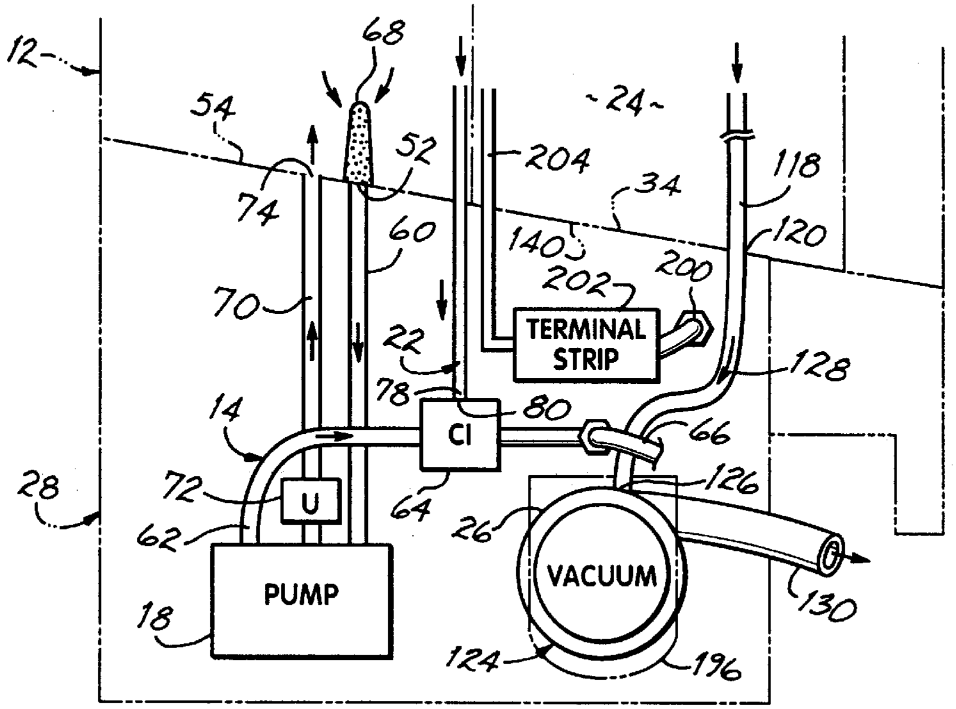
FIG. 3 is a generally-broken-away side view of the base unit of the multi-functional cleaning machine shown in FIGS. 1 and 2, showing a schematic flow diagram of various elements entering and exiting the base unit.

With reference to FIGS. 1 and 3, the inner end of the liquid delivery line is connected to a water intake opening 52 in the bottom wall of the water tank, with the liquid delivery line extending down into the base unit, where it subsequently exits from the right sidewall 56 of the base unit, with the outer end of the liquid delivery line being releasably connected to a high-pressure spray gun. One suitable spray gun 58 is the MV910 spray gun available from Pump Tech, Inc., Minneapolis, Minn. As best shown in FIG. 3, the liquid delivery line includes a water tank-to-pump section 60, the pump itself, a pump-to-cleaning-liquid injector section 62, a cleaning-liquid injector 64, and an external section, with the outer end of the external section being connectable with the spray gun.

Although various types of pumps may be used, with the pumps offering different gallon-per-minute (GPM) and pounds-per-square inch (PSI) values, advantageously, the pump is a positive displacement pump. Moreover, it has been found that particularly beneficial results may be achieved with a positive displacement pump having 400 PSI and 1.0 GPM performance characteristics. One such pump is the Series 205 pump available from Pump Tech, Inc., Minneapolis, Minn. In addition, if desired, several of the other components of the liquid delivery line may be obtained from Pump Tech, Inc. as well. For example, the water tank-to-pump section may be a Pump Tech ½ inch KP hose, connected to the water tank and pump using Pump Tech barbed tubing fittings. The pump-to-cleaning-liquid injector section may be a Pump Tech pulse hose having a male swivel at one end for connection to the pump, and a female connector at the other end for connection to the cleaning-liquid injector. If desired, a conventional in-line filter (not shown) may be positioned in this pump-to-cleaning-liquid injector section; for example, the filter may be threaded directly to the injector. The cleaning-liquid injector advantageously Is a venturi-type injector, in which the injection portion of the injector becomes open or closed as a function of the pressure in the portion of the liquid delivery line between the pump and the spray gun. One suitable injector is the Pump Tech injector having a 1.6 millimeter injection orifice and a ⅜" male connection on each side of the injector. The injector may be secured directly to a Pump Tech bulk head fitting positioned on the right side of the base unit, with the external section of the liquid delivery line advantageously being a 50 foot length of Pump Tech's ¼ inch inner diameter 300 PSI pressure hose. In addition, the water intake opening of the bottom wall of the water tank includes a filter 68 which extends up into the interior space of the water tank. If desired, the filter may be a 311 filter available from Custom Plastics Manufacturing of Ontario, Calif. As seen in FIGS. 1 and 3, the pressure washing system also includes a liquid return line 70 which includes an unloader 72. If desired, the unloader may be connected directly to the pump, with the liquid return line connecting the unloader to a return opening 74 in the bottom wall of the water tank. Advantageously, the unloader may be a Pump Tech MV510-350 unloader, connected to the pump using a Pump Tech reducer and elbow, and connected to the water tank using Pump Tech's ½ inch KP hose and a barbed tubing fitting on each end of the hose.

As seen in FIGS. 1 and 3–5, one of the many highly beneficial features of the Machine is the existence of an independent cleaning-liquid feed system, which enables an operator to select from any one of a number of different cleaning liquids positioned in separate containers atop the Machine, and to have the selected liquid drawn into the liquid delivery line downstream of the pump. One of the many benefits of the particular versions of the Machine in which the cleaning-liquid draw line enters the liquid delivery line downstream of the pump is that any particularly harsh cleaning liquid, such as an acidic chemical, does not pass through the pump itself, thereby extending the life of the pump. This feed system also allows an operator to switch from one cleaning-liquid to another, quickly and easily, at anytime during the cleaning process. In more detail, the cleaning liquid feed system includes a cleaning-liquid draw line 22 extending from above the top wall of the Machine, down through a passageway 76 between the water tank and the vac tank, with the lower end 78 of the draw line being secured to the injection port 80 of the cleaning-liquid injector. If desired, a conventional in-line filter (not shown) may be positioned along the cleaning liquid draw line; for example, the Filter may be spliced into the draw line. As seen in FIGS. 1 and 4, the portion of the draw line above the top wall may be connected to, or disconnected from, any of a number of different containers, through the use of a quick disconnect member 82, which mates with a corresponding quick disconnect member 84. The upper end 86 of the draw line includes a proportioning element 88 in the form of a metering tip, with the proportioning element enabling a user to select a desired ratio of cleaning-liquid-to water exiting from the spray gun. In addition, because the proportioning element is removable, an operator may select a particular proportioning element from a series of elements having different sizes, thereby enabling the operator to choose a different cleaning-liquid-to-water ratio. Suitable metering tips are available from Essential Industries of Merton, Wis.

As shown in FIGS. 1 and 2, the Machine's vacuum system is a multi-functional, multi-component system, including a wet-vac assembly 90, a detachable dry-vac assembly 92, and a detachable blow-dry assembly 94, any of which may be operated using the same vacuum source. With reference to FIGS. 1–4, the top 96 of the vac tank includes a vac intake port 98 having a vac intake nozzle 100 which is sized to slidingly engage with a hose cuff 102 on the inner end 104 of a vacuum hose 106. The top of the vac tank further includes a switch box 108 with switches 110 for operating the pump and vacuum assemblies, as well as an access port 112. The access port includes a threaded mounting ring 114 for engaging with a corresponding threaded access port cover 116. The interior of the vac tank includes a stand pipe 118 which is securely fastened to an opening 120 in the bottom wall of the vac tank. A float closure 122 is connected to the top of the stand pipe, in order to prevent liquid from entering into the pipe.

A vacuum motor assembly 124 is mounted in the base unit, with the vacuum suction intake 126 being connected to the stand pipe via a section of vac hose 128, and the vacuum exhaust nozzle 130 extending outward from the lower front wall of the base unit. The vacuum motor assembly may be any suitable assembly. One such assembly is vacuum motor model number 115937 available from the Lamb Electric Division of Ametek Inc., Kent, Ohio. As best seen in FIGS. 1 and 4, the vac tank also includes an elongated, conically-shaped reinforcing member 134 extending from the vac tank front wall 136 to the vac tank rear wall 138. This reinforcing member is centrally positioned within the vac tank, with respect to the vac tank top and bottom walls 96, 140, as well as the vac tank left and right sidewalls 142, 144.

Figure 6:
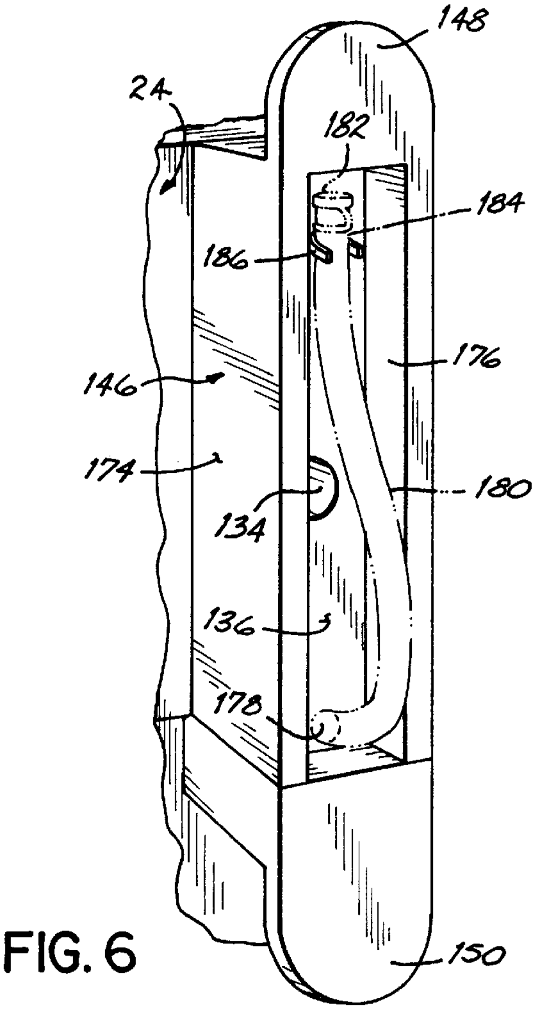
FIG. 6 is a perspective view of a portion of the front wall of the vac tank and base unit of the multi-functional cleaning machine of FIGS. 1 and 2.

With reference to FIGS. 1, 2, and 6, the front of the Machine includes a hose wrap 146 for storing the vac hose when not in use. The vac hose wrap is formed by a forwardly extending projection of both the vac tank and the base unit, and includes an upper retaining member 148 and a lower retaining member 150 which assist in maintaining the vac hose in its stowed position. When the Machine is prepared for use in the wet-vac mode, the wet-vac floor vacuuming assembly is connected to the vac intake port. In more detail, the wet-vac floor vacuuming assembly includes the vac hose, a hand-held wand 152, and a floor squeegee tool 154. A suitable wand is the 21AP5 wand from United Electric, Burlington, N.C., and a suitable tool is the D370 floor squeegee tool from Wessel Werk, Hillsboro, N.J. The floor squeegee and wand sub-assembly may be removed from a stowed position (not shown) on the Machine. If desired, the stowing position (not shown) may be on the front wall of the vac hose wrap, and include a clamp on an upper portion of the wrap front wall, and a cup-like receptacle on the lower portion of the wrap front wall. If desired, the clamp may be a CLPR-150B C clamp from Beckson Manufacturing, Bridgeport, Conn., and the receptacle may be a conventional piece of PVC pipe having a cap on the lower end. In addition, the vac hose may be unwound and removed from the vac hose wrap, with one end of the vac hose being connected to the wand, and the other end being connected to the vac intake port, as shown in FIG. 1. Also as shown in FIG. 1, the Machine includes a muffler assembly 156 which is attached to the exterior of the base-unit bottom wall 158. This muffler assembly includes a muffler 160 connected to a length of vac hose 162 having a hose cuff 164 on the other end. If desired, the muffler assembly may be used when the Machine is operated in either the wet-vac or dry-vac mode, simply by inserting the muffler assembly hose cuff into the vacuum exhaust nozzle. A suitable muffler is the 9835K27 muffler available from McMaster Carr of Aurora, Ohio.

If the Machine is to be operated in the dry-vac mode, an operator simply removes the cover from the access port, and secures a dry-vac canister 166 to the access port. The dry-vac canister should be operated with a filter (not shown), such as a reusable cloth filter or a disposable paper filter. As shown in FIG. 1, the dry-vac canister includes a removable lid 168 and intake port 170 for connection to a dry-vac tool assembly. A suitable dry-vac assembly is easily formed by attaching a conventional dry-vac tool (not shown) to the hand-held wand, and connecting this sub-assembly to the vac hose. Although any desired length of vac hose may be used, a length of about 25 feet has been found to be beneficial. Suitable vac hose material (for example 15N50WO vac hose), as well as hose cuffs (for example, 150 ES cuffs) may be obtained from United Electric of Burlington, N.C.

With reference to FIG. 2, if the Machine is to be operated in the blow-dry mode, the muffler-assembly hose cuff is removed from the vacuum exhaust nozzle, and a blow-dry assembly is attached to the exhaust nozzle. The blow-dry assembly is conveniently formed by attaching one end of the vac hose to the vacuum exhaust nozzle, and connecting a blow-dry tool 172 to the other end of the vac hose 174. As one of ordinary skill will appreciate, a number of different tools are available for use in the blow-dry mode. The particular tool shown may be releasably secured to the Machine using a conventional clamp, when not in use. One suitable clamp is the CLPR-150B C clamp from Beckson Manufacturing. If desired, the clamp may be positioned on the back wall of the water tank, toward the top of the tank.

As best seen in FIGS. 1 and 6, the portion of the forwardly projecting vacuum hose wrap formed by the water tank includes an elongated, recessed cavity 176. At the base of this cavity, the vac tank includes a dirty-water outlet 178 adjacent the vac-tank bottom wall. The dirty-water outlet is connected to a flexible dump hose 180 having a removable extension plug 182 releasably connected to its outer end 184. The dump hose may be made of the same vac hose material described above, with a suitable expansion plug being the 2613K21 plug from McMaster Carr of Aurora, Ohio. In addition, the upper portion of the recessed cavity includes a clamp 186 which clamps about the upper end of the dump hose when the hose is in its stowed, upright position. One suitable clamp is the CLPR-200B C clamp from Beckson Manufacturing. Moreover, the dump hose is positioned substantially within the elongated, recessed cavity when it is in this stowed position. One of the many advantages of the dirty-water outlet is its height above the level of the ground. In particular, the outlet is high enough above the ground that, when the vac tank contains dirty water to be drained, substantially all of the dirty water may be drained through the outlet into a toilet of standard height. Therefore, there is no need for an operator to drain the water into a floor drain, which tends to overflow, dirtying an already-cleaned floor surface. Moreover, if the Machine is being used in a restroom, the operator does not have to move the Machine to a specific custodial slop sink or drain, which may be far away from the restroom being cleaned. If desired, the Machine may be sized such that the dirty-water outlet is at least about 14 inches above ground level (standard toilet bowl height is about 14 inches) and advantageously, at least about 16 inches above ground level.

As shown in FIGS. 1, 2 and 4, the Machine also includes easily accessible wraps for stowing the external section 188 of the liquid delivery line and the external section 190 of the power cord. In more detail, the upper portion of the vac tank includes a liquid delivery line upper wrap 192 on the right-hand side and a power cord upper wrap 194 on the left-hand side. These upper wraps may be used in conjunction with their corresponding left (not shown) and right 196 lower wraps positioned on the left and right exterior sidewalls of the base unit.

Figure 5:
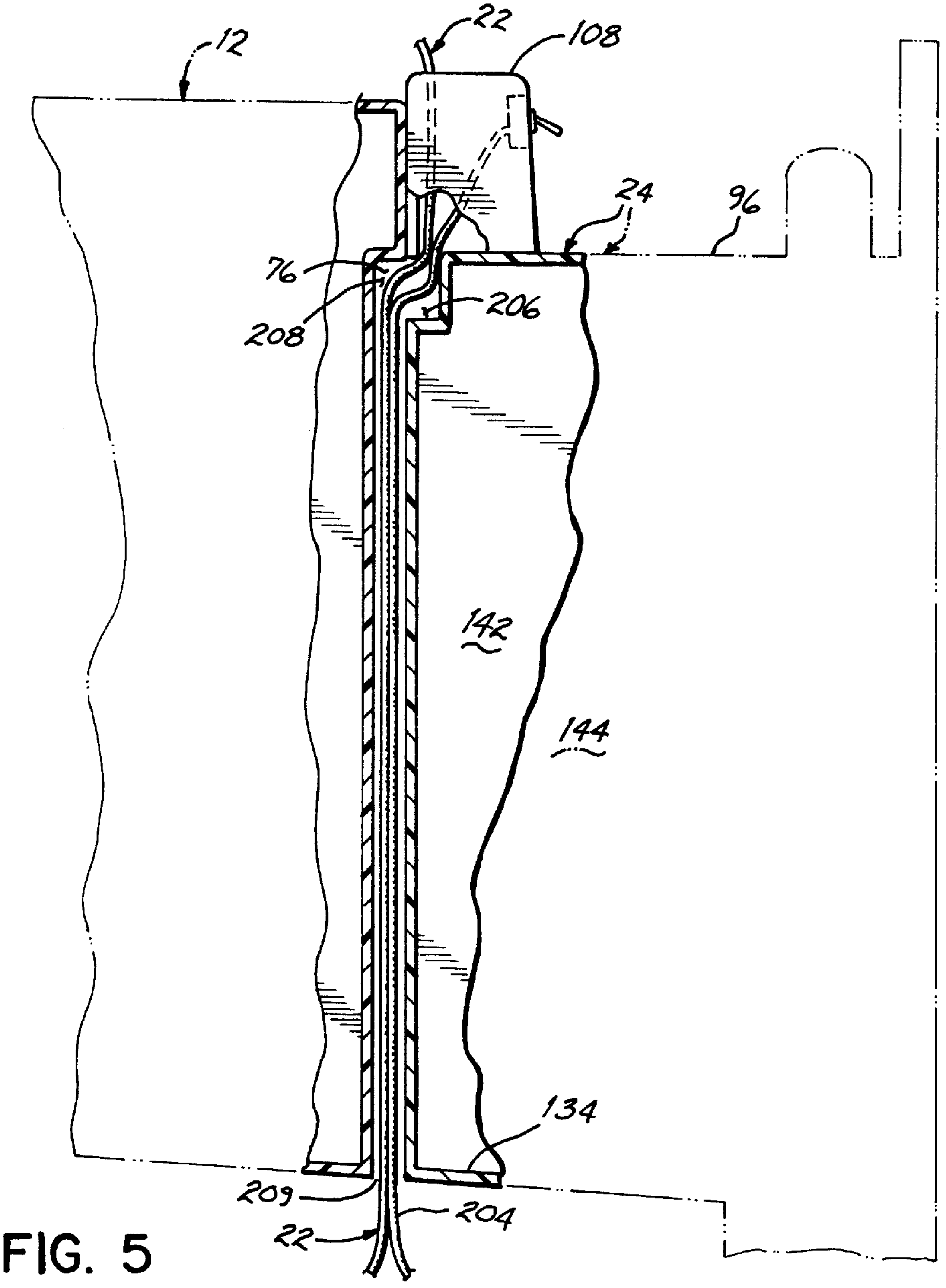
FIG. 5 is a partial cross-sectional view of a portion of the multi-functional cleaning machine, taken generally along line 5—5 of FIG. 4.

The multi-functional cleaning machine's power system may be better understood with reference to FIGS. 3–5. The exterior end of the power cord includes a ground fault circuit interrupter (GFCI) 198, which may be connected to any conventional 110 volt outlet. The external section of power cord may be any desired length, with 50 feet having been found to be a particularly useful length. The external power cord then enters the base unit through an opening 200 along the left sidewall, above the power-cord lower wrap (not shown), where the appropriate wires are connected to a terminal strip 202, as will be readily understood by one of ordinary skill in the art. In addition, and with reference to FIG. 5, the toggle switches of the switch box are wired using conventional wiring techniques, with the electrical wiring 204 running from the switch box, down through the passageway created by the vac-tank longitudinal recess 206 and by the water-tank longitudinal recess 208, through the passageway opening 209 in the top wall of the base unit, where the electrical wiring is connected to the power strip, as will be understood by those of ordinary skill in the art. The cleaning-liquid draw line shares this same passageway between the water tank and vac tank, with the upper portion of the draw line extending up through the switch box. The switch box is a separate, rotationally molded part, which may be bolted onto the top wall of the vac tank.

Figure 7:
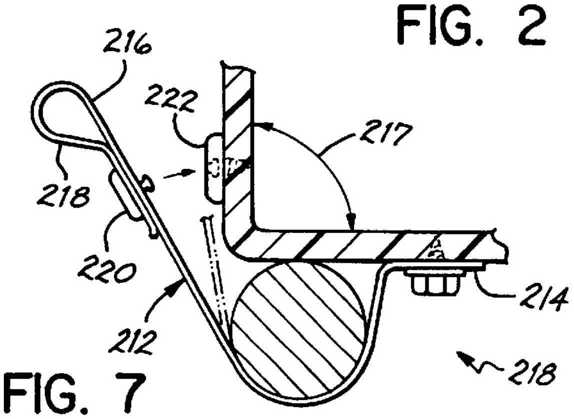
FIG. 7 is an enlarged cross-sectional view of a portion of the multi-functional cleaning machine taken generally along line 7—7 of FIG. 2.

The multi-functional cleaning machine includes several other features, all of which serve to enhance the usefulness of the Machine as a mobile, multi-functional cleaning center, and to enhance the effectiveness, productivity, and morale of the personnel using the Machine. For example, the Machine includes a cleaning tool stowing assembly. The particular version 210 of the assembly shown in FIGS. 2 and 7 comprises a strap 212 having a first end 214 and a second end 216, with the first end secured to the right sidewall of the water tank, the second end releasably secured to the back wall of the water tank, and the interior angle 217 between the walls being about 90 degrees. This stowing assembly advantageously includes a loop pull 218 at the second end, and male and female button fasteners 220, 222 adjacent the second end, for quickly accessing and/or stowing a particular tool. The machine further includes a receiving well 224 along the exterior of the right sidewall of the base unit, which may be used to receive a handle end-portion of a particular cleaning tool. The particular version of the Machine shown in FIG. 2 also has a chassis 226 along the bottom wall of the base unit. The chassis includes a first elongated tube 228 connected to the right side of the base unit bottom wall and a second elongated tube (not shown) connected to the left side of the bottom wall of the base unit. The first elongated tube supports a caster wheel at the front and a large wheel at the rear, with similar wheels (not shown) being attached to the second elongated tube. A suitable caster wheel is the 1G2424 inch caster wheel assembly from Grainger of Cincinnati, Ohio, and a suitable large wheel is the ten inch, rotationally molded, polyethylene wheel from Industrial Farm Tank, Inc., Lewiston, Ohio. In connecting the large wheels to the chassis, the chassis further incorporates an axle (not shown) which is rigidly connected to the elongated tubes. The large wheels then may be positioned on the axle, with a conventional hubcap securing each wheel onto the axle.

The particular version of the Machine shown in FIG. 2 also includes an upper rearward extension 230. The extension is molded as a part of the water tank, and includes a right-side rear extension 232 having an upper wheel 234 and a left-side rear extension also having an upper wheel (not shown). If desired, the upper wheel may be a 3 inch, rubber wheel from Grainger of Cincinnati, Ohio. The upper rearward extension further includes a handle bar (not shown) running between the right-side and left-side extension pieces. The handle bar is particularly useful in enabling an operator to push or pull the cleaning machine in a desired direction. In addition, because of the relatively compact size of this particular version of the Machine, the Machine may be readily stowed in a horizontal position, with the water-tank back wall 236 and the base-unit back wall 238 facing downward, and the Machine resting on the upper wheels and the large wheels. Moreover, the Machine may be conveniently loaded into a vehicle by leaning the upper end of the Machine toward and onto the vehicle support surface, and then rolling the Machine into the particular vehicle using the upper wheels.

The particular version. of the multi-functional cleaning machine shown in FIG. 1 is quite similar to the version of FIG. 2. However, the version shown in FIG. 1 is a longer Machine, having an elongated chassis and correspondingly elongated wheel base. Moreover, this unit includes an upper storage tray 240 and a lower storage tray 242 for additional storage capacity onboard the mobile machine.

The multi-functional cleaning machine may be made in several convenient steps. In one particular method, each of the water tank, vac tank, and base unit housings is made using traditional plastic rotational molding techniques. The water tank is molded such that it includes three threaded inserts (not shown) rotationally molded into the bottom wall, and accessible from the bottom wall exterior of the water tank, with one insert being centrally located in the bottom wall of the water tank, a second insert being positioned in the back left quadrant, and a third insert being positioned in the back right quadrant. The bottom wall of the water tank further includes a downwardly extending key (not shown) which fits into a corresponding keyway (not shown) on the top wall of the base unit. The exterior front wall of the water tank includes a threaded insert (not shown) molded into the upper left and upper right portions of the water tank, as well as a longitudinal keyway (not shown) extending along part of the length of the front wall, for engaging with a corresponding key (not shown) on the exterior back wall of the tank. The molded water tank also has a longitudinal recess along the front wall, which is used in forming the passageway for receiving the electrical wiring and cleaning-liquid draw line.

With regard to the vac tank housing, the bottom wall of the vac tank includes three rotationally molded threaded inserts (not shown), with one insert being centrally located in the bottom wall of the vac tank, a second insert being positioned in the front left quadrant, and a third insert being positioned in the front right quadrant, with the three molded inserts being accessible from the exterior of the vac tank bottom wall. As mentioned briefly above, the back wall includes a key running along a portion of the length of the vac tank, which corresponds with the keyway of the water tank. In addition, the bottom wall of the vac tank includes a key (not shown) extending along at least a part of the base of the tank, in the direction of the front and rear walls, for engagement with the corresponding keyway in the top wall of the base unit housing. The vac tank housing also includes a portion of the vac hose wrap, as well as various molded components along the top and front walls of the vac tank housing. These molded components include the vac intake port and an upper wrap projection on the left and right sides for use in coiling the power cord and liquid delivery line, respectively. The back-wall of the vac tank further includes a longitudinal recess which, in combination with the water-tank longitudinal recess, forms a passageway for the cleaning-liquid draw line and electrical wiring.

The base unit housing includes a keyway extending along at least a part of the length of the top wall of the housing between the housing front and rear, for receiving the key portion of the bottom wall of the water tank and the vac tank. In addition, the base unit housing includes various molded portions, such as the lower portion of the vac hose wrap along the front of the unit, as well as the lower wrap projection on the left and right sides corresponding with each upper wrap projection, for use in coiling the power cord and liquid delivery line, respectively.

Once the three housing units have been manufactured, various holes are formed in the units. For example, two side-by-side holes (not shown) are formed in the bottom wall of the water tank, with one of the holes serving as a water intake opening for water to move into the liquid delivery line, and the other hole serving as a return opening for water to return to the tank. A 52HD fitting (having ⅜ inch internal threads at both ends) from Custom Plastics, Ontario, Calif. is spin welded into each hole. In addition, two holes are drilled in the top wall of the water tank, thereby forming the water-tank fill port and access port. With the vac tank, a hole is formed in the front wall of the vac intake port, and a No. 72 (1½ smooth) fitting is spin welded into the hole, thereby forming the vac intake port nozzle. A hole is formed in the front left quadrant of the bottom wall of the tank, with the hole serving as a vacuum suction intake access port between the stand pipe and the connecting hose leading to the vacuum suction intake. A 56 DT fitting (1½ inch internal threading) from Custom Plastics is spin welded into this hole. In addition, a hole (not shown) is formed in the upper left and right quadrants of the back wall of the vac tank, and a hole is formed in the front wall of the vac tank, near the base of the elongated, recessed cavity, with this hole serving as the dirty-water outlet for water to flow into the dump hose. A No. 72 fitting (1½ smooth) from Custom Plastics is spin welded into the dirty-water outlet hole. With the base unit housing, holes are formed in the top of the housing which correspond with the side-by-side holes of the water tank, the stand-pipe hole of the vac tank, and the elongated passageway leading downward between the water-tank and vac-tank. Additionally, a hole is formed above the left-side and right-side lower wraps through which the power cord and liquid delivery line, respectively, will subsequently extend. In the lower left quadrant of the front wall of the base unit (when viewed from the exterior front), a hole is formed for the exhaust nozzle of the vacuum assembly. In addition, a large rectangular opening is cut in the bottom wall of the base unit housing, thereby providing ready access to the interior of the housing for installation of various components, such as the pump assembly, vac assembly, and power strip.

At this point in the process, the water tank housing and vac tank housing may be attached to one another. This is accomplished by orienting the front wall of the water tank toward the back wall of the vac tank. The bottom walls of the two housings are connected to one another by running a metal strip along the bottom of the two housings, from one centrally located threaded insert to the other centrally located threaded insert, and installing a bolt through each end of the strip and into the corresponding metal insert. The water tank and vac tank housings are further secured to one another by placing a bolt through each of the upper left and right quadrants of the vac tank back wall, and threading each of these bolts into the corresponding insert molded into the front wall of the water tank.

With the water tank and vac tank housings connected together, the water filter may be threaded into a spin weld fitting of the water tank intake opening, followed by the installation of a downwardly-connected hose barb connector. On the vac tank housing, a mounting flange having internal threads is aligned with the access port on the top wall of the vac tank, and the flange is bolted to the top wall, with the flange capable of threadingly engaging with the access port cover, as well as with the base of the dry-vac canister. The dump hose may be connected to the fitting of the dirty-water outlet by putting a silicone sealant onto the fitting and/or interior of the hose , and placing a hose cuff on the hose. At the other end of the hose, a 1½ inch length of aluminum tubing (for example, a section of hose-wand material) may be inserted into the hose end, to provide enhanced rigidity for the outwardly expandable hose plug. The stand pipe is threaded into a spin weld fitting of the vacuum suction intake access port on the bottom wall of the tank, and the float closure is mounted to the top of the stand pipe, and a thread-to-pipe adapter is attached to the same spinweld fitting from the exterior of the vac tank bottom wall. As shown in FIG. 1, the float closure 122 is hingedly connected to the top of the stand pipe. In particular, the float closure includes a pivot plate having a float bulb on one end and a hemispherically-shaped sealing member, such as ½ of a neoprene rubber ball on the other end of the pivot plate. This pivot plate is hingedly connected to a 1½ in female-to-female coupling using a conventional plastic hinge, with the coupling further including a mesh filter. This coupling is connected to a 1½ inch pipe thread adapter, which is connected to the t op of the stand pipe. In an alternate, and perhaps more beneficial version (not shown) of the float closure, the float closure is a rotationally molded unit which is releasably connected to the top of the standpipe. In particular, this particular unit includes a horizontal rectangular element integrally connected to a depending jug-or flask-like element. Both the horizontal rectangular element and the jug-like element are hollow, with the jug-like element including a tapered opening which narrows toward the top of the element, where the element meets the horizontal rectangular element. The float chamber includes a float ball, and the opening at the interface of the jug-like element and horizontal rectangular element is sized such that, when the float ball rises to the top of the jug-like element, it forms a releasable seal, thereby closing off the opening between the two elements, and preventing solution in the vac tank from flowing into the stand pipe. In further detail, the float chamber includes one or more apertures or ports which enable air, and ultimately soiled solution, to enter into the float chamber. Advantageously, a mesh filter bag is positioned around the exterior of the float chamber, and secured about the top of the tapered neck of the float chamber with a draw string or other similar device. The horizontal rectangular element further includes a spin weld fitting depending from its bottom wall, which releasably fits into the top opening of the standpipe. If desired, the float ball may be installed in the float chamber by drilling a hole in the base of the chamber, placing the float ball in the chamber, and subsequently closing the hole by spin welding a patch over the hole.

At this point, the base unit housing may be secured to the water tank/vac tank combination by positioning the key along the bottom wall of the water tank and vac tank into the keyway along the top wall of the base unit housing, while simultaneously aligning the holes between the bottom surface of the water tank/vac tank assembly and the top surface of the base unit housing. The base unit then is bolted to the water tank and vac tank housings by inserting bolts in the holes in the comer quadrants of the base unit top wall and into the corresponding threaded inserts formed in the bottom wall of the water tank and vac tank housings.

Prior to mounting the pump within the base unit housing, the pump may be prepared by attaching the water tank-to-pump section of line into a pump intake port, attaching the liquid-return line, including the unloader, to a pump discharge port, and connecting the pump-to-cleaning-liquid injector section of line to another pump discharge port, with the other end of the section being connected to the cleaning-liquid injector. The pump, itself, may be bolted to the left inside wall of the base unit, with the vacuum motor assembly being bolted to the right inside wall of the base unit, and the terminal strip being bolted to the left inside wall of the base unit. If desired, the vacuum assembly may be positioned such that a portion of the motor, including the cooling fan sub-assembly, is positioned within the cavity created by the lower right wrap projection, as generally shown in FIG. 3. In addition, once all components have been assembled and connected within the base unit, a cover plate may be releasably secured to the bottom wall, thereby covering the large access opening.

In use, the multi-functional cleaning machine is a highly versatile, productive cleaning tool, suitable for use in a number of different sanitary applications. For example, the Machine is beneficial in cleaning restrooms. In this particular cleaning application, as with any other application in which the Machine is used, the Machine may be operated by a single person, or by a team of people. If, for example, a two-person team is used, then various features of the Machine may be used simultaneously.

One particular two-person method for cleaning a restroom using the multi-functional cleaning machine involves a "gunner" and a "loader". The gunner is the lead person, having overall responsibility for the operation of the Machine, whereas the loader follows the gunner's lead, and has primary responsibility for supplies and for the preparation of the restroom for cleaning. First, the gunner fills the water tank at a convenient water source, by adding water through the fill port of the water tank, using any of a number of traditional filling methods. The water tank may be filled to within several inches of the top of the tank. In the meantime, the loader may stock paper and soap dispensers, flush fixtures, pick-up trash and large objects from the floor, move chairs, trash cans and other movable objects out of the restroom, and, if desired, place a walk-off mat in the doorway of the restroom, to prevent tracking any water out into the hallway.

Figure 8:
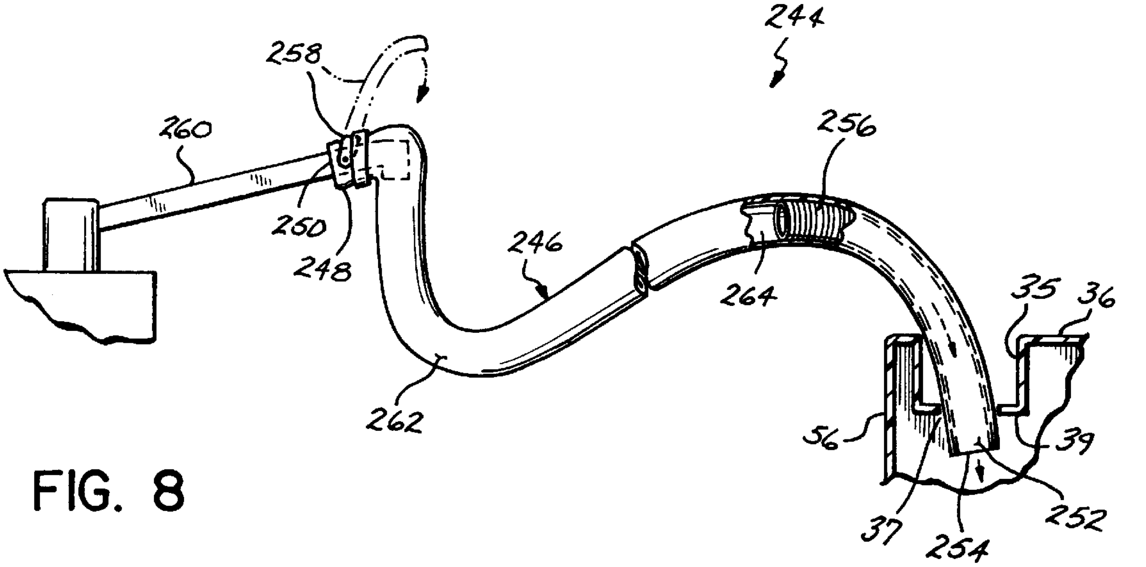
FIG. 8 is a partially-broken-away side view of one version of the liquid transport device of the present invention.

Depending upon the layout of the particular building, or room being cleaned, it may be beneficial to use a liquid transport device, such as the device 244 shown in FIG. 8, to fill the water tank. A liquid transport device is particularly advantageous because it allows an operator to fill the water tank virtually anywhere a faucet is located. For example, if a restroom is being cleaned, a restroom sink faucet may be used, whereas if a cafeteria or cafeteria kitchen is being cleaned, a kitchen sink faucet may be used. Without the use of a liquid transport device, an operator may be forced to move the machine to a different part of the building in order to fill the water tank, thereby wasting valuable time. However, a liquid transport device gives the operator fantastic flexibility, in that the water tank may be filled wherever a faucet is located. The version of the liquid transport device shown in FIG. 8 includes a liquid conduit 246 having a first end 248 with a liquid-receiving opening 250, a second end 252 with a liquid-dispensing opening 254, and a conduit reinforcing member 256. The liquid transport device also includes a faucet fastener 258 connected to the liquid conduit, which enables the liquid transport device to be releasably connected to a faucet 260. The particular version of the liquid transport device shown in FIG. 8 includes an outer liquid conduit 262 in the form of a natural rubber hose having a length of about five feet. The outer liquid conduit has a passageway 264 for conveying water from the faucet, with the conduit reinforcing member being positioned in the passageway. The conduit reinforcing member shown is a length of spa hose which has a rigidity greater than the rigidity of the natural rubber hose. This conduit reinforcing member shown is adjacent the second end of the liquid conduit, and, depending upon the curving forces exerted on the liquid conduit, the conduit reinforcing member is biased against the outer liquid conduit. As shown, the conduit reinforcing member is fastened to the outer liquid conduit with any conventional fastener, for example, a rivet or the like. The faucet fastener advantageously is a length of VELCRO® hook and loop fastener strap which is securely fastened to the first end of the liquid conduit.

In use, the first end of the liquid conduit is releasably fastened to the faucet by pulling the first end onto and over a portion of the faucet, wrapping the length of VELCRO® hook and loop fastener strap tangentially around the faucet and first end, and securing the VELCRO® hook and loop fastener strap snugly onto itself. The second end of the liquid conduit is placed through the fill port into the water tank of the Machine, and the faucet may be turned on, thereby delivering water into the water tank. Depending upon the position of the liquid transport device, the conduit reinforcing member may be beneficial, in that it can prevent the liquid conduit from crimping or collapsing, thereby preserving the ability of the device to transport water from a faucet into the water tank. Once the water tank has been filled, the liquid transport device may be conveniently stowed away by wrapping the unreinforced portion of liquid conduit about the reinforced portion, securing the VELCRO® hook and loop fastener strap about this bundle, and reinserting the second end of the liquid conduit through the fill port in the water tank. If the water is particular hard, it may be beneficial to add a rinse additive to the water tank, thereby increasing the sheeting action of the cleaning solution and/or water being sprayed from the spray gun, and reducing the likelihood of the formation of water spots. Any conventional rinse additive may be used, such as those typically used in the commercial dishwashing industry for washing glassware.

Once the water tank has been filled, the gunner may unwrap both the vac hose and the external section of the liquid delivery line. The gunner then unwraps the external section of the power cord and plugs the ground fault circuit interrupter into a wall outlet, preferably an outlet outside the restroom. The gunner then pushes the "on" button on the ground fault circuit interrupter.

If the Machine has been used to clean other restrooms or other areas of the particular building, the vac hose may contain a bit of dirty water and debris. If this is the case, the gunner quickly and conveniently rinses out the vac hose by keeping the inner end of the vac hose securely fastened to the vac intake port, and positioning the outer end of the vac hose through the water-tank access port, and into the water in the tank. The gunner then turns the vac switch on and allows the vacuum motor to run for several minutes, thereby flushing the hose by sucking water from the water tank into and through the vac hose, and into the vac tank. Then, in order to dry the vac hose, the gunner removes the vac hose outer end from the water tank, and secures the outer end to the vacuum exhaust nozzle. In this fashion, air is forced through the vac hose, thereby drying the interior of the hose. Once this hose cleaning procedure is completed, the gunner may turn the vac motor off.

At this point, the gunner selects the desired cleaning liquid from the various cleaning liquids conveniently stored in the recessed wells across the top of the water tank. Then, the gunner simply connects the quick disconnect member to the complementary quick disconnect member on the desired chemical container. If the gunner is operating a Machine which does not include the quick disconnect feature, then the operator simply places the upper end of the cleaning-liquid draw line into the desired container.

At this point, the gunner takes up the spray gun, turns on the pump motor, and, using the lower pressure, sprinkle mode of the spray gun, sprays diluted cleaning solution on all of the water-safe surfaces in the restroom, adjusting the spray pattern of the gun from fan to pinpoint, as needed. If the Pump Tech gun is used, the gunner simply pushes the cone (not shown) on the end of the gun forward, thereby activating the low-pressure mode. Because the gunner uses the spray gun in the sprinkle mode during this particular phase of the cleaning process, the gunner prevents the particular solution from being aerosolized, thereby reducing the risk of inhaling any of the cleaning liquid. Simultaneously, if needed, the loader follows behind the gunner with a manual brush, and brushes any extremely soiled surfaces. When the gunner has finished spraying cleaning solution onto the water-safe surfaces, the loader disconnects the quick disconnect from the particular cleaning liquid container, or removes the liquid feed line from the container. The gunner then clears the remaining cleaning solution from the external section of the liquid delivery line by adjusting the spray gun to the high-pressure mode and running the spray gun until the solution has been cleared from the line section. If the Pump Tech gun is used, the gunner converts the machine to the high-pressure mode by pulling the cone on the gun back. Accordingly, the switch from low-pressure to high-pressure is made quickly and easily at the spray gun, itself, without having to return to the water tank or vac tank, which may be many feet away. The gunner typically can tell when the section has been cleared because the liquid coming out of the gun will begin to run clear. The timing of this procedure will vary depending on the length of the external section, and if, for example, a twenty-five foot section is used, the process typically takes about 10 seconds.

At this point, the loader manually brushes the areas of the floor around the urinals, toilets, and sinks, as needed, using a corner brush and a deck brush, a process which typically takes about 10 minutes. This step loosens deep soils and allows disinfectant in the cleaning solution sufficient time to act on bacteria which may exist on various restroom surfaces. At this point, the gunner and loader are ready to begin the high-pressure cleaning, rinsing, and blow-drying steps. The gunner maintains the spray gun in the high-pressure mode, and continues the cleaning process by pressure-washing and rinsing all of the water-safe surfaces, in a generally top-to-bottom movement, thereby flushing dirt and cleaning liquid to the floor. Because the gunner follows the chemical disinfecting step with a mechanical pressure-cleaning step, the various restroom cleaning surfaces are cleaned far more thoroughly than they would be using conventional cleaning equipment. Moreover, with respect to the pressure-cleaning step, the gunner may adjust the intensity of the mechanical cleaning action of the water by adjusting the spray gun nozzle to achieve spray patterns of different diameter and intensity (from pinpoint to fan) and/or by adjusting the amount of trigger-pull. During this pressure-cleaning and rinsing step, the gunner should avoid spraying water onto electrical outlets, electrical fixtures, and other surfaces susceptible to water damage.

Either prior to or during the pressure-cleaning step, the loader or gunner repositions the vac hose on the Machine so that the Machine is ready to operate in the blow-dry mode. This conversion is done swiftly and conveniently by removing the inner end of the vac hose from the vac intake port, and connecting the inner end of the vac hose to the vac exhaust nozzle. In addition, the loader or gunner attaches the blow-dry tool to the vac hose outer end. With the blow-drying assembly in place, the loader then turns the vac motor on, and follows behind the gunner, who is performing the simultaneous pressure-cleaning and rinsing step, and blows air on the various fixtures, working in a generally top-to-bottom motion. While the loader is completing the blow-drying step, the gunner loops the external section of the liquid delivery line around the upper and lower wraps, while simultaneously wiping the section dry with a cloth.

At this point, the gunner converts the cleaner into its wet-vac, suction mode by removing the inner end of the vac hose from the vac exhaust nozzle and securing the inner end to the vac intake port. The gunner then connects the floor squeegee tool and wand to the vac-hose outer end. If desired, the gunner or loader may apply a conventional defoamer to the floor. For example, the defoamer may be applied using a conventional spray bottle. The use of a defoamer may be particularly beneficial where there is a high concentration of cleaning chemicals on the floor. In such a situation, if a defoamer is not used, it is quite likely that suds will form in the vac tank during the extraction step. However, by spraying a small amount of defoamer onto various portions of the wet floor, the loader or gunner actually prevents suds from being formed, thereby avoiding the potential problem of sud formation in the vac-tank.

At this point, if the vac motor has been turned off, the gunner turns the vac motor on, and extracts the solution of spent cleaning liquid and dirty water into the vac tank, while simultaneously cleaning and drying the floor. While the gunner is performing the extraction step, the loader returns any furniture or other items to the restroom which may have been removed at the beginning of the process, and picks up the walk-off mat. When the gunner has completed the extraction process, the gunner disconnects the wand from the vac hose, and stows the wand on the side of the Machine. The gunner then loops the vac hose onto the vac hose wrap, allowing the vac motor to continue to run, so as to prevent dripping from the end of the hose, and wipes the outer surface of the hose with a cloth as necessary. At this point, the multi-functional cleaning machine and the gunner are ready to move on to the next restroom, where the loader has already begun the cleaning process described above. Note that, although the process of using the Machine has been described in detail in conjunction with a restroom, the same general process may be used, or modified, to clean any suitable area in and around a building, as will be apparent to one of ordinary skill upon reading this Detailed Description.

At some point in the process of cleaning multiple areas of a particular building with the Machine, the vac tank will become full, and the gunner will have to drain the dirty solution from the vac tank. The gunner will know that the vac tank is full because the float closure will seal the top of the stand pipe, thereby preventing the vac motor from drawing a vacuum. Because of the Machine's design, the gunner may drain the vac tank in virtually any convenient draining location, even including a standard restroom toilet. In particular, the bottom wall of the vac tank is positioned at a level which is high enough above the ground that the soiled solution may be drained into a toilet. In performing the draining step, the gunner grasps the upper portion of the flexible dump hose and releases the upper portion from the clamp which is attached to the vac tank front wall in the elongated, recessed cavity. The gunner then unscrews the expandable plug and removes it from the end of the dump hose, while keeping the outer end of the hose above the liquid level of the vac tank. Then the gunner positions the hose into the toilet or other drain, and allows the soiled solution to drain from the vac tank. Once the vac tank has been emptied, the gunner secures the expandable plug back into the end portion of the dump hose, and reattaches this end portion to the clamp on the front wall of the vac tank.

As mentioned briefly above, the Machine is capable of performing numerous other cleaning applications, depending upon the sanitary maintenance needs of the particular facility. For example, the Machine is effective in cleaning cafeterias, kitchens, locker rooms, and shower rooms. The Machine also may be used to strip floors, clean carpets, dust in high, hard-to-reach areas, pick up salt and/or water during winter time and rainy seasons, and clean entrance mats, windows, walls, and stairwells.

In performing these various cleaning applications, an operator may want to use job-specific, detachable, Machine components. For example, with reference to FIGS. 1 and 4, when an operator needs to perform traditional dry vacuuming, he or she may convert the Machine into dry-vac mode. In order to do this, the operator removes the threaded cover from the access port of the vac tank, and threads a dry-vac canister onto the access port. The operator then may open the dry-vac canister, install a vacuum bag, place the canister lid back on the canister, and connect the inner end of the vac hose to the intake port on the top of the dry-vac canister. In this fashion, the Machine then may be operated in dry-vac mode simply by turning on the vac motor switch. The dry-vac canister may be made using the same rotational molding process used to form the water tank, vac tank, and base unit.

Figure 9:
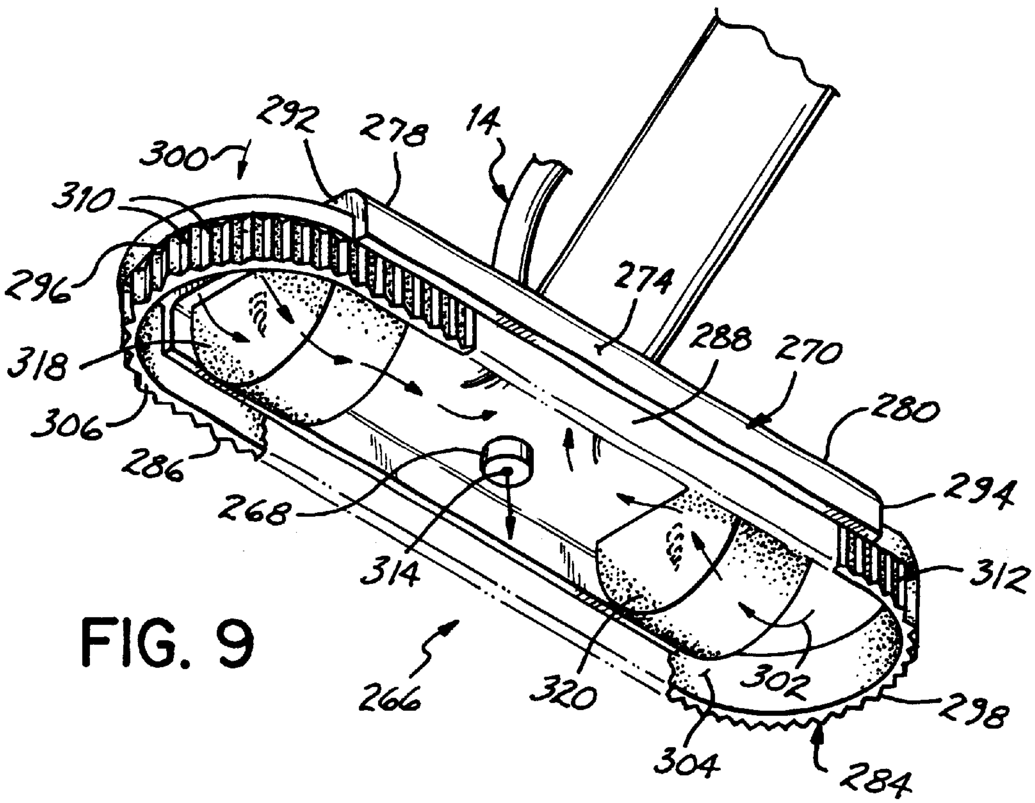
FIG. 9 is a perspective view of a version of the grout cleaning tool of the present invention.
Figure 11:
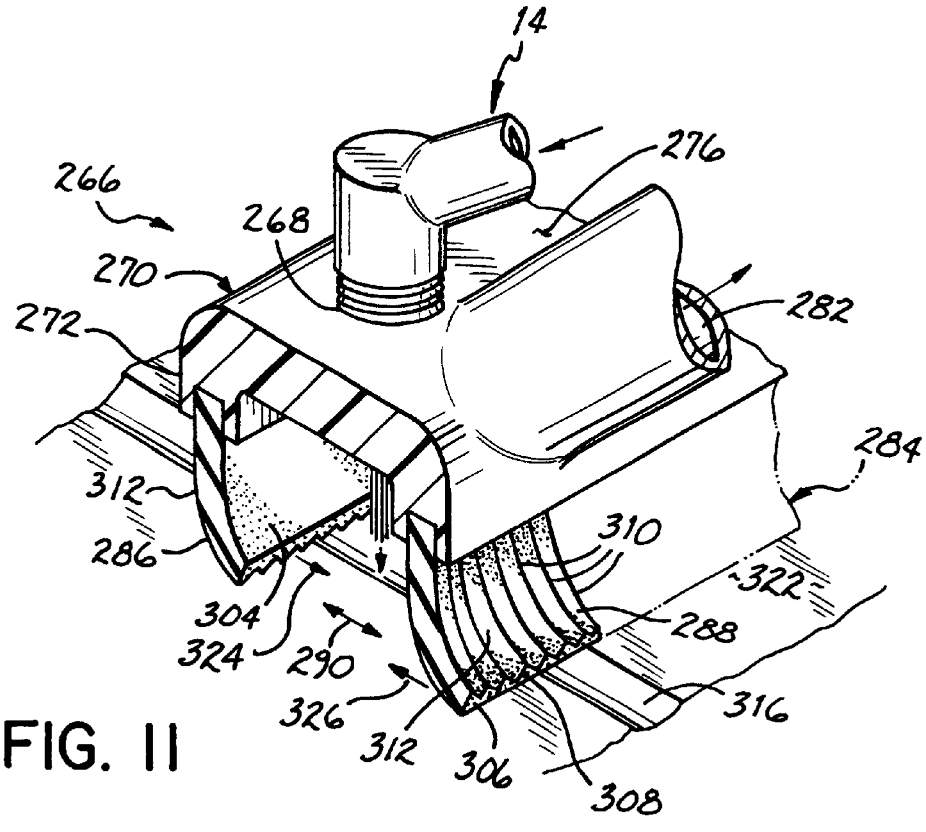
FIG. 11 is another partial cross-sectional view of the grout cleaning tool of FIG. 9.
Figure 10:
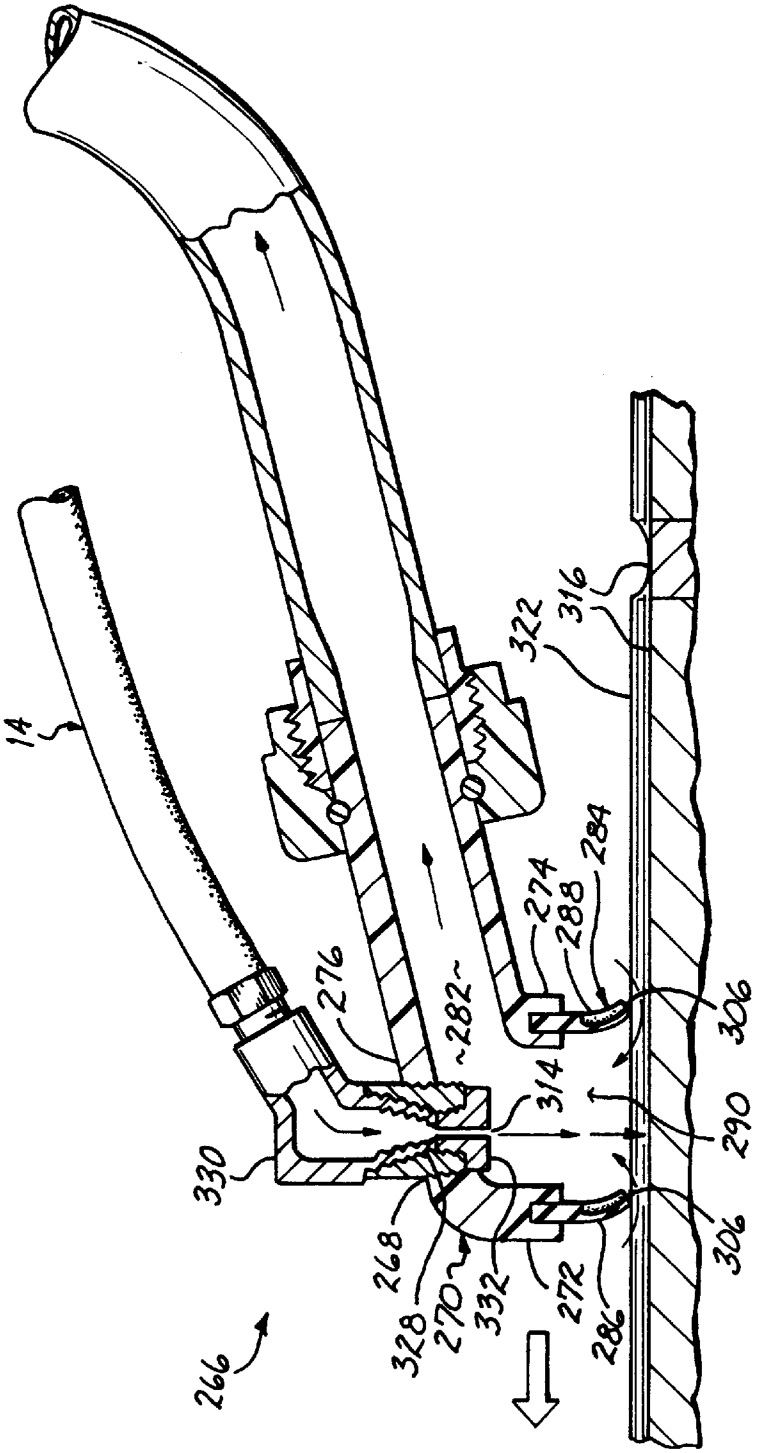
FIG. 10 is a partial cross-sectional view of the grout cleaning tool shown in FIG. 9.

If an operator needs to clean grout lines, such as those frequently found on floors used in commercial kitchens and restrooms, the operator may use a grout cleaning tool, such as the version 266 shown in FIGS. 9–11. In order to prepare the Machine for grout cleaning, the user simply replaces the floor squeegee tool on the end of the wand with the grout cleaning tool, connects the wand to the vac hose, and connects the vac hose to the vac intake port. In addition, the user disconnects the spray gun from the liquid delivery line, and attaches the line to the liquid delivery opening 268 on the grout cleaning tool. The user then turns on both the vac motor and pump motor, and moves the grout cleaning tool along the grout lines to be cleaned.

With reference to FIGS. 9–11, the version of the grout cleaning tool shown includes a housing 270 having a front 272, a back 274, a top surface 276, a left side 278, and a right side 280, the top surface including a liquid delivery opening and a soil uptake opening 282. The tool further includes a flexible wall 284 having a front portion 286 depending from the housing front, and a back portion 288 depending from the housing back, thereby forming a blast chamber 290 between the front and back portions. In more detail, the housing left side includes a left end 292 and the housing right side includes a right end 294. In addition, the flexible wall is continuous, including a left wall portion 296 and a right wall portion 298, extending laterally outward beyond the left end and right end, respectively, thereby creating a left air intake 300 and a right air intake 302 into the blast chamber. The flexible wall further includes an interior surface 304, and a base surface 306 having an outer edge 308, with the outer edge having serrations 310 which extend upward along the exterior surface 312 of the flexible wall. If desired, the grout cleaning tool also may include a T-slot system for connecting the flexible wall front and back portions to the front and back walls of the housing. In such a system (not shown), the flexible wall may have a first end and a second end which are connectable, so as to form a flexible wall which is continuous. In addition, the front and back portions may have a T-shaped cross-section, corresponding with a T-shaped channel in the housing front and back. Alternatively, the T-shaped channel may be formed in a separate elongated member which fits tightly into an elongated cavity in the housing front and back. Such a T-slot system provides for quick removal and replacement of the flexible wall.

In further detail, the liquid delivery opening of the tool includes a blast chamber orifice 314 which is extremely small and generally cylindrical, thereby directing a relatively narrow jet of highly pressurized water directly onto a grout line 316. The tool also incorporates a left glide 318 and a right glide 320, both of which depend from the housing, and assist in maintaining the housing slightly above the level of the floor 322 being cleaned. However, because the flexible wall is somewhat longer than the glides, the flexible wall remains in contact with the floor, thereby reducing the chance that water and/or soil from a grout line will escape from beneath the tool.

As best seen in FIG. 10, one of the many advantages of the tool is the flexible wall having serrations which extend from the outer edge of the base surface upward along the exterior surface, whereas the inner edge of the base surface is generally smooth. As shown in FIG. 10, when the grout cleaning tool is moved in a forward direction, the flexible-wall front and back portions bend slightly backward. This action enables air, water, and/or soil to enter into the blast chamber through the space created between the serrations and the floor as at 324. On the other hand, the wall back portion provides a smooth surface against the floor, thereby having a squeegee like effect as at 326, containing the water and dirt in the blast chamber until it is taken up through the soil uptake opening. This same beneficial situation occurs when the tool is pulled back in a rearward direction along a grout line, with the roles of the front and back portions essentially being reversed.

As will be apparent to one of ordinary skill upon reading this Detailed Description, the grout cleaning tool may be made from any of a number of different materials. For example, if desired, the housing and the glides may be made of plastic using a conventional plastic injection molding process. And if the glides are made as separate components, they may be secured to the housing using screws, an adhesive, or another fastening device. The soil uptake opening may include any conventional fastening device capable of releasably engaging with the wand. With respect to delivery of a highly focused blast of pressurized liquid, a brass pipe fitting may serve as a dual coupler 328, and may be positioned in the liquid delivery opening, and secured in place using a cement. A ¼ inch pipe fitting 330 having a 45 degree elbow may be threaded into the upper end of the coupler, with the other end of the elbow having female threads for receiving male threads on the end of the external section of the liquid delivery line. The pipe plug 332 which is positioned on the interior side of the coupler may conveniently be a ¼ inch pipe plug having male threads which threadingly engage with the female threads on the coupler. This pipe plug advantageously has a blast chamber orifice with a diameter of about 0.05 inch or less. If desired, a diameter of about 0.043 inch or 0.02 inch may be used. In addition, the serrated flexible wall may be made of a neoprene rubber and held in place in any of a number of different ways. For example, the wall may be adhesively bonded to the front and rear walls of the housing, or connected using the T-slot system discussed above.

If an operator wishes to use the Machine as a carpet extractor, then the operator may attach any conventional carpet extractor tool (not shown) to the wand, and to the external section of the liquid delivery line, as will readily be understood by those of ordinary skill in the art upon a review of this Detailed Description.

Figure 12:
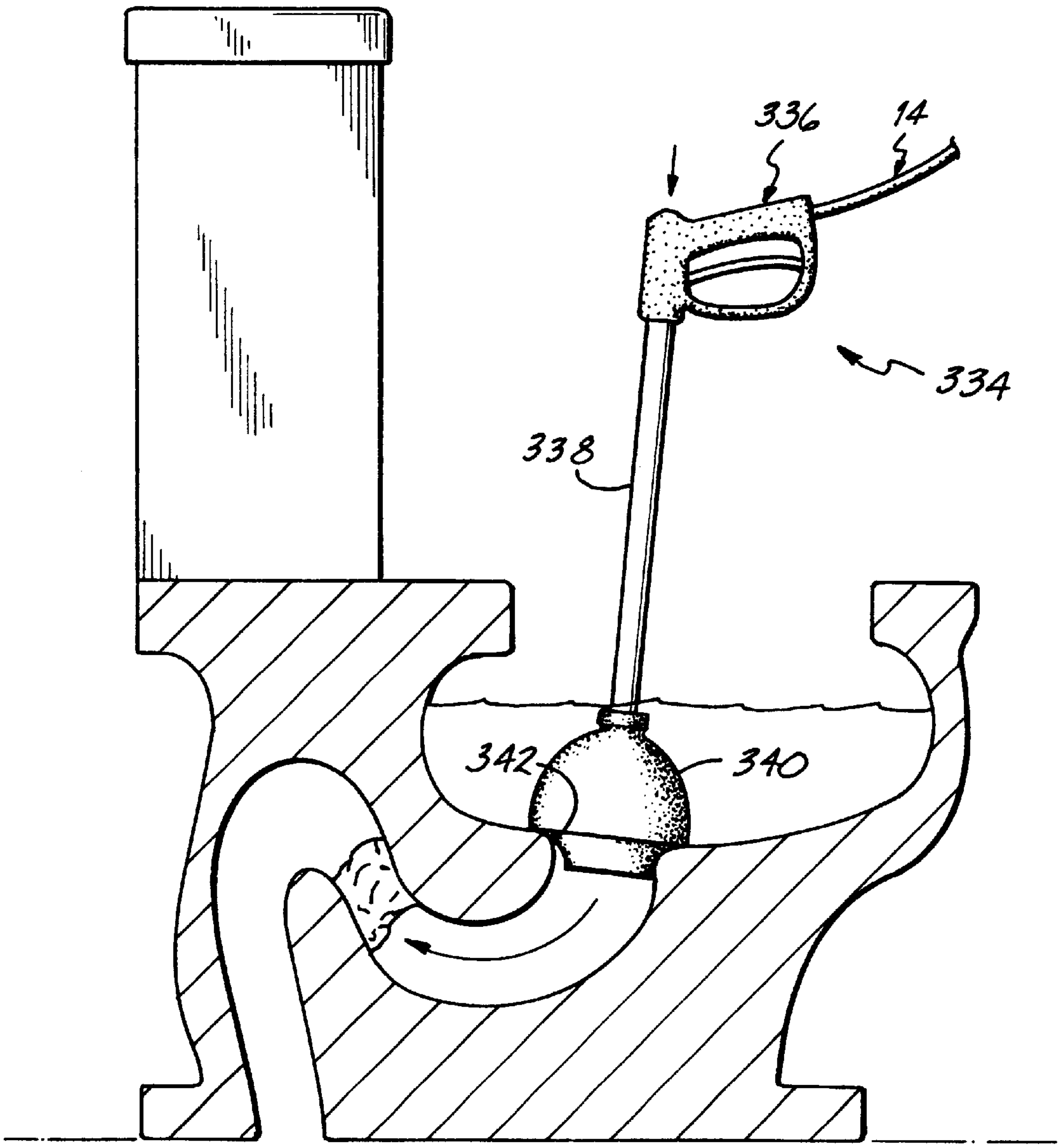
FIG. 12 is a partial cross-sectional view of a version of the plunger gun of the present invention.
Figure 13:
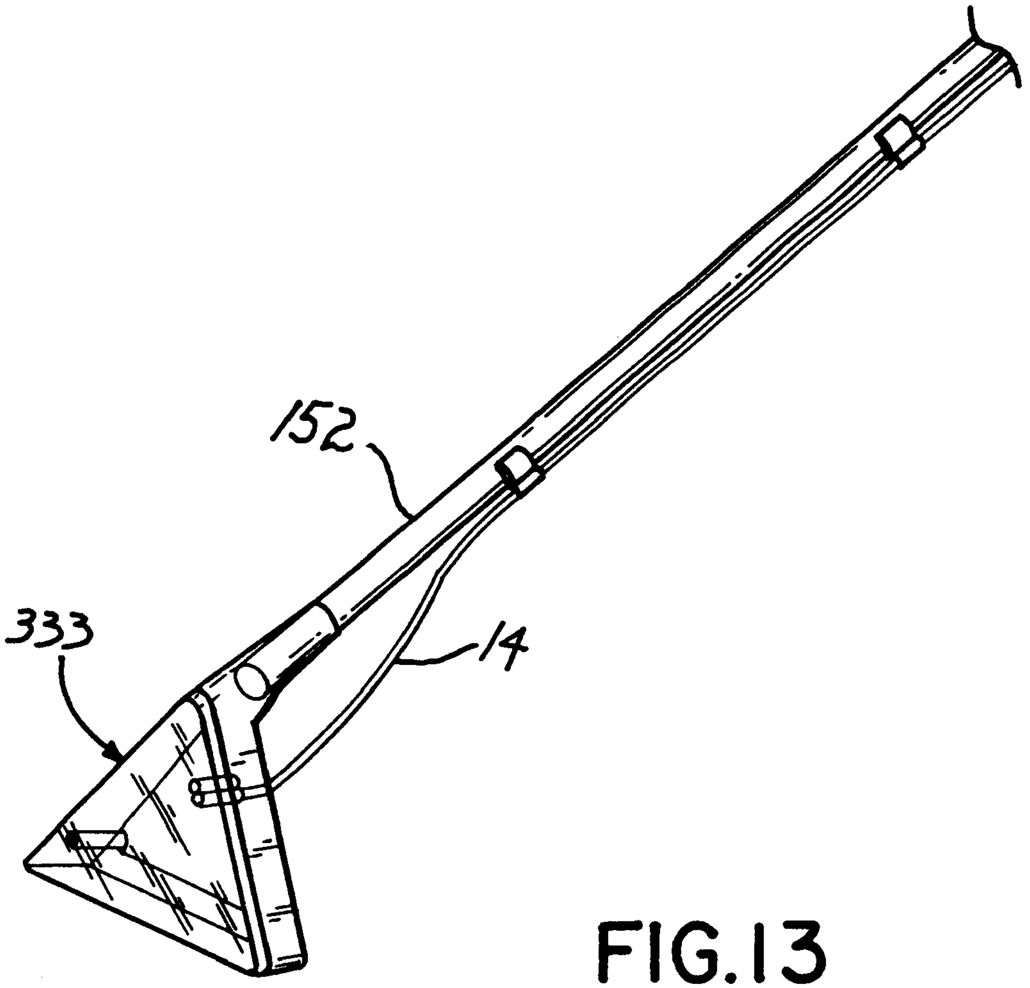
FIG. 13 is a perspective view of a conventional carpet extractor tool releasably attached to a wand and liquid delivery line of the present invention.

If an operator needs to unstop clogged toilets or drains, or perform a similar function, the operator may use a plunger gun, such as the version 334 shown in FIG. 12. The plunger gun shown includes a high-pressure, spray gun 336 having an elongated barrel 338, and a plunger bulb 340 connected to the barrel. In order to prepare the Machine for plunger gun use, a user simply disconnects the spray gun from the liquid delivery line, and releasably attaches the line to the plunger gun. Then the user turns the pump on, and releasably seals the plunger bulb about the toilet bowl opening 342 or drain opening, exerting a continuous force against the opening. Because of the high degree of pressure and high volume of water coming out of the plunger gun, it may be beneficial to seat the plunger bulb in place before turning the pump motor on. The plunger gun may be manufactured conveniently using any conventional high-pressure spray gun having a barrel-like extension, and any conventional plunger bulb. Advantageously, the spray-gun is the same MV910 spray gun from Pump Tech discussed above, and the elongated barrel is Pump Tech's MV20B barrel. Depending on the diameter and surface features of the outer end of the barrel portion, as well as the diameter of the upper opening of the plunger bulb, the barrel and bulb may be secured in any of a number of different ways, as will readily be appreciated by those of skill in the art. For example, if the plunger bulb includes standard broom threads, and the diameter of the upper opening of the bulb is smaller than the diameter of the barrel, it may be necessary to drill the threads out of the upper end of the plunger, so that the plunger may be securely fastened to the outer end portion of the barrel.

While the present invention has been illustrated by description of versions, and while the illustrative versions have been described in considerable detail, it is not the intention of the inventor to restrict or any way limit the scope of the appended claims to such detail. Additional advantages and modifications will readily appear to those skilled in the art upon reading this Detailed Description. Therefore, the invention, in its broader aspects, is not limited to these specific details, representative apparatus and methods, and illustrative examples shown and described. Accordingly, departures may be made from such details without departing from the spirit or scope of the inventor's general inventive concept.

What is claimed is:

1. A liquid transport device, comprising:

a liquid conduit having a first end with a liquid-receiving opening, a second end with a liquid-dispensing opening, an outer liquid conduit having a passageway for conveying liquid, and a conduit-reinforcing member positioned in the passageway; and a faucet fastener connected to the liquid conduit, wherein the conduit-reinforcing member is adjacent the second end and is fastened to the outer liquid conduit with a fastener.

2. A liquid transport device, comprising:

a liquid conduit having a first end with a liquid-receiving opening, a second end with a liquid-dispensing opening, and a conduit-reinforcing member, the conduit-reinforcing member comprising corrugated flexible tubing having a length, the liquid conduit having a length greater than the length of the corrugated flexible tubing; and a faucet fastener connected to the liquid conduit.

3. The device of claim 2 wherein the liquid conduit includes an outer liquid conduit having a passageway for conveying liquid, the conduit-reinforcing member being positioned in the passageway.

4. The device of claim 3 wherein the conduit-reinforcing member is adjacent the second end.

5. The device of claim 2 wherein the first end is elastic, whereby the first end may be pulled onto and over a portion of any of a number of faucets of different shapes and sizes.

6. The device of claim 2 wherein the faucet fastener is adjacent the first end.

7. The device of claim 6 wherein the faucet fastener includes a strap having hook and loop fasteners.

8. The device of claim 2 wherein the faucet fastener includes a strap having hook and loop fasteners.

* * * * *

UNITED STATES PATENT AND TRADEMARK OFFICE

CERTIFICATE OF CORRECTION

PATENT NO. : 6,431,217 B2
DATED : August 13, 2002
INVENTOR(S) : Robert S. Robinson It is certified that error appears in the above-identified patent and that said Letters Patent is hereby corrected as shown below:

Column 2,
Line 28, "washer were use to" should read -- washer were used to --.
Line 43, "do not have there own" should read -- do not have their own --.
Line 59, "which-enable a" should read -- which enable a --.

Column 6,
Line 50, "advantageously Is a" should read -- advantageously is a --.

Column 7,
Line 30, "the Filter may be" should read -- the filter may be --.

Column 10,
Line 36, "1G2424 inch caster" should read -- 1G242 4 inch caster --.

Column 12,
Lines 8 and 20, "(1½ smooth) fitting" should read -- (1½ inch smooth) fitting --.

Column 13,
Line 52, "comer" should read -- corner --.

Column 15,
Line 24, "water is particular hard, it may" should read -- water is particularly hard, it may --.

Signed and Sealed this

Eleventh Day of February, 2003

JAMES E. ROGAN
*Director of the United States Patent and Trademark Office*